UNITED STATES PATENT OFFICE.

LUCIEN LOUIS BÉTHISY, OF PARIS, FRANCE.

UNINFLAMMABLE NITROCELLULOSE PRODUCT.

SPECIFICATION forming part of Letters Patent No. 625,313, dated May 23, 1899.

Application filed July 20, 1898. Serial No. 686,404. (No specimens.)

*To all whom it may concern:*

Be it known that I, LUCIEN LOUIS BÉTHISY, chemist, a resident of 71 Boulevard Voltaire, Paris, France, have invented new and useful Improvements in Uninflammable Nitrocellulose Products, (for which applications for patents have been filed in France, dated February 19, 1898, No. 275,161; in Germany, dated May 24, 1898, and in Great Britain, dated May 25, 1898, No. 11,927,) of which the following is a full, clear, and exact description.

My invention consists of a new compound or product having a base of cellulose, such as flax, hemp, cotton, &c., the said compound being produced either in the solid and plastic or in the liquid state. The said product has the quality of being uninflammable in the solid or plastic state, while in the liquid condition it is adapted to form a coating or varnish for celluloid or the like, whereby to diminish or altogether destroy the inflammability.

The manufacture of the plastic or solid product comprises a series of stages, as hereinafter described, of which the first is the conversion of vegetable cellulose into pyroxylin. For this purpose six and one-half pounds of cellulose are steeped for about two hours in a mixture of sulfuric acid at 66°, about one hundred and thirty-two pounds, and nitric acid at 1.32 specific gravity, about forty-four pounds, the said mixture being maintained at a temperature of 85° Fahrenheit in the usual way. The nitrocellulose is then centrifugated until it contains only about half its weight of acid, after which it is steeped in fuming sulfuric acid.

The second operation is pulping and bleaching. The nitrocellulose or pyroxylin is reduced in a paper-pulping machine and is then washed with carbonate of soda and afterward in water. It is then transferred to the bleaching-vats and about three times its volume of water is added, of which three-fourths is run off in order to remove the carbonate of soda. About two per cent. of permanganate-of-potash solution is added to destroy the organic coloring-matters, and after standing an hour the tank is filled up with water and stirred. The pulp is then washed in abundance of water, after which an aqueous solution of sulfurous acid is added. It is then drained and let rest for about twenty-four hours and then centrifugated until the pulp contains no more than about fifty per cent. of water.

The third operation is partial desiccation and grinding and the incorporation of a binder. The grinding is effected in three stages in cone-mills. At the first grinding from ten per cent. to fifteen per cent. of camphor or naphthalene only is added. At the second grinding is added from about ten per cent. to fifteen per cent. of desiccated albumen, (egg or blood,) as well as from ten per cent. to fifteen per cent. of mica in powder, if it is required to produce a transparent incombustible composition, or from ten per cent. to fifteen per cent. of alum and powdered asbestos, if an opaque composition is desired. At the third grinding suitable coloring-matters are added, according to the desired color of the product.

The fourth operation is the conversion into collodion. The above-described mixture is first pressed under hydraulic pressure of about two thousand pounds per square inch into thin cakes, which are then broken up and moistened with about twenty per cent. of alcohol at 96°, after which there is added ten per cent. of the pasty mixture hereinafter mentioned. Essential oil and vaseline oil are dissolved in acetic ether, with the addition of from twenty per cent. to fifty per cent. (according to the desired degree of flexibility or rigidity of the product) of liquid chlorid of zinc at 45° and from five per cent. to ten per cent. white gelatin. The paste is allowed to rest for twenty-four hours in a closed vessel before use.

The fifth operation is that of solidification and baking. The collodion thus obtained is cut up into pieces of from ten to twenty pounds, which are kneaded between a pair of rolls heated to 60° until the paste has acquired a suitable consistence, formed into sheets of about three-eighths of an inch thick, which are placed in a tightly-closed receptacle for about twelve hours. The material is then condensed into a compact homogeneous condition, for which purpose the block-pressers ordinarily used for condensing celluloid are used. The material is then sliced into sheets of required thickness by the same means as are employed for celluloid.

The essential property of the plastic celluloid composition thus produced is its uninflammability, a property due to the novel composition of the product and more especially to the introduction therein of chlorid of zinc. The celluloid composition also possesses all the other properties of known products having a base of cellulose—such as celluloid, xylonite, &c.—which are, however, highly inflammable. By varying the proportions this celluloid composition may be rendered permanently flexible or as rigid as required, and hence it can be used like celluloid for making collars, cuffs, and other imitation linen goods and also for making waterproof fabrics, toys, and fancy goods, artificial leaves and flowers, and for electrical purposes, &c., as well as for many other uses for which celluloid or the like is unsuitable on account of its inflammability.

The composition in the liquid form is the collodion obtained at the fourth operation, as herein described. It is an incombustible varnish suitable as a coating for celluloid and the like, whereby to render the same uninflammable. The celluloid may in certain cases be exposed to the action of the vapors of glacial acetic acid and afterward dipped into the liquid incombustible composition for the purpose of being rendered uninflammable.

I claim—

1. The new composition of matter, to wit, an uninflammable cellulose product comprising a base of nitrocellulose with a binder rendered incombustible by the presence therein of zinc chlorid.

2. A new composition of matter composed of nitrocellulose with a binder, alcohol, essential oil, vaseline oil, acetic ether, zinc chlorid, and white gelatin, said matters being incorporated in about the proportions specified.

LUCIEN LOUIS BÉTHISY.

In presence of—
ALFRED DESIRÉ CILLARD,
JULES MATHIEU.